_US005932645A_

United States Patent [19]
Kawanaka et al.

[11] Patent Number: 5,932,645
[45] Date of Patent: Aug. 3, 1999

[54] FLUORINE RUBBER-CONTAINING COATING COMPOSITION FOR SCREEN PRINTING

[75] Inventors: Teruaki Kawanaka; Eiichi Oohira; Hiroo Buseki, all of Kanagawa, Japan

[73] Assignee: Nippon Reinz Co., Ltd., Japan

[21] Appl. No.: 08/813,286

[22] Filed: Mar. 10, 1997

Related U.S. Application Data

[63] Continuation of application No. 08/534,158, Sep. 26, 1995, abandoned.

[30] Foreign Application Priority Data

Sep. 29, 1994 [JP] Japan ..................................... 6-261720
Sep. 29, 1994 [JP] Japan ..................................... 6-261721

[51] Int. Cl.$^6$ ..................................................... C08K 3/04
[52] U.S. Cl. .......................... 524/462; 524/445; 524/451; 524/463; 524/495; 525/199
[58] Field of Search ..................................... 524/462, 495, 524/445, 451, 463; 525/199

[56] References Cited

U.S. PATENT DOCUMENTS

| | | | |
|---|---|---|---|
| 3,194,796 | 7/1965 | Squire | 260/80.5 |
| 4,183,837 | 1/1980 | Tamura et al. | 260/31.8 F |
| 4,321,306 | 3/1982 | Eguchi | 428/421 |
| 4,503,179 | 3/1985 | Yoshimura et al. | 524/262 |

*Primary Examiner*—Marion McCamish
*Assistant Examiner*—John J. Guarriello
*Attorney, Agent, or Firm*—Pendorf & Cutliff

[57] ABSTRACT

A coating composition for screen printing containing a fluorine rubber in a dissolved state is disclosed, wherein the solvent for the fluorine rubber comprises 60 to 100% by weight, based on the total solvent, of an ester ranging in boiling point from isoamyl acetate to isobornyl acetate. The coating composition which, even when formulated as a thick solution for providing a thick coat as used in the production of a metal gasket, hardly clogs the screen thereby making continuous coating possible.

8 Claims, No Drawings

FLUORINE RUBBER-CONTAINING COATING COMPOSITION FOR SCREEN PRINTING

REFERENCE TO RELATED APPLICATION

This Application is a continuation of U.S. application Ser. No. 08/534,158 entitled "FLUORINE RUBBER-CONTAINING COATING COMPOSITION FOR SCREEN PRINTING" filed Sep. 26, 1995.

FIELD OF THE INVENTION

This invention relates to a fluorine rubber-containing coating composition for screen printing which is suitable for providing a thick coat for the production of a metal gasket and which is prevented from drying on a screen thereby making continuous coating possible. It also relates to a fluorine rubber-containing coating composition for screen printing comprising a thick solution for providing a thick coat which is suitable for the production of a metal gasket.

BACKGROUND OF THE INVENTION

Conventionally known fluorine rubber-containing coating compositions suitable for screen printing use a ketone solvent, such as methyl ethyl ketone or methyl isobutyl ketone, for dissolving the fluorine rubber. Such coating compositions are used to form a fluorine rubber coat on one or both sides of a metallic core material having a single layer structure or a laminate structure to produce a metal gasket, such as a cylinder head gasket.

However, the above-mentioned ketone solvents, though excellent in dissolving power for fluorine rubbers, volatilize easily due to high vapor pressure at room temperature. It follows that the coating composition dries during coating operation by screen printing to clog the screen, making it difficult to carry on coating continuously.

If a high-boiling solvent having low volatility is used instead, a fluorine rubber is less soluble, and the resulting coating composition would have an increased viscosity. Besides having poor coating properties, a viscous coating composition is ready to cause clogging of a screen through slight volatilization. If the amount of the solvent is increased in order to prevent clogging, it is difficult for the coating composition having a reduced concentration to provide a thick coat.

Further, where the concentration of a coating composition is increased for formation of a thick coat, the coating composition tends to entrain air bubbles while it is pressed out through the screen perforations and the air bubbles tend to be entrapped in the coating layer. Entrapped air bubbles in a coating layer of a gasket cause not only insufficient sealing performance of the gasket but poor appearance.

In order to overcome these problems, various improvements have been added to the screen mesh size or coating means, such as a doctor and a squeegee, but no satisfactory results have been reached yet.

SUMMARY OF THE INVENTION

An object of the present invention is to provide a fluorine rubber-containing coating composition for screen printing which, even when formulated as a thick solution for providing a thick coat by screen printing, hardly clogs the screen thereby making continuous coating possible.

Another object of the present invention is to provide a fluorine rubber-containing coating composition for screen printing which, even when formulated as a thick solution for providing a coating thickness, e.g., of 7 µm or more, by screen printing, does not entrain air bubbles while it is pressed out through the screen perforations to cause air bubble entrapment into a coating layer and therefore provides a fluorine rubber coat excellent in sealing performance and appearance.

As a result of extensive investigations, the inventors of the present invention have found that use of an ester solvent for dissolving a fluorine rubber provides a fluorine rubber solution having a lower viscosity than that of a solution prepared by using a ketone solvent whose boiling point is close to that of the ester solvent. Even when formulated as a thick solution for forming a thick coat, the resulting fluorine rubber-containing solution hardly dries so that it does not cause clogging of a screen in screen printing thereby making continuous coating possible.

The inventors have also found that the viscosity of a fluorine-rubber solution can be reduced through some unknown mechanism by incorporating a prescribed amount of carbon powder into the solution and particularly by dissolving a mixture of a fluorine rubber and carbon powder in a solvent. The thus prepared fluorine rubber solution can be applied by screen printing without involving entrapment of air bubbles into a coating layer even when formulated as a thick solution for providing a thick coat. Therefore, the solution efficiently provides a thick coat, making it feasible to easily produce a metal gasket having excellent sealing performance in large quantities.

The present invention provides a coating composition for screen printing containing a fluorine rubber in a dissolved state, wherein the solvent which dissolves the fluorine rubber comprises 60 to 100% by weight, based on the total solvent, of an ester ranging in boiling point from isoamyl acetate to isobornyl acetate.

In a preferred embodiment of the present invention, the coating composition comprises a thick solution for providing a thick coat containing 15 parts by weight of carbon powder per 100 parts by weight of the fluorine rubber.

DETAILED DESCRIPTION OF THE INVENTION

The ester solvent which can be used in the present invention is selected from various esters ranging in boiling point from isoamyl acetate (142.5° C.) to isobornyl acetate (215° C.), such as isoamyl acetate, n-amyl acetate, cyclohexyl acetate, isoamyl propionate, isoamyl butyrate, butyl butyrate, and isobornyl acetate.

One or more ester solvents may be used for dissolving a fluorine rubber. If desired, solvents other than esters, such as ketone solvents, e.g., methyl ethyl ketone and methyl isobutyl ketone, may be used in combination. In this case, the ester solvent should be used in a proportion of at least 60% by weight based on the total solvent. If the proportion of the ester solvent is less than 60% by weight, it is sometimes difficult to prepare a thick solution which has a reduced viscosity and therefor hardly dries, and the resulting coating composition tends to clog the screen during coating operation. Taking the viscosity of the fluorine rubber solution into consideration, a preferred proportion of the ester solvent in the total solvent is not less than 65% by weight, still preferably not less than 70% by weight, and particularly preferably not less than 75% by weight.

The coating composition for screen printing according to the present invention contains a fluorine rubber in a dissolved state. The fluorine rubber to be used is not particularly limited, and an appropriate fluorine rubber can be selected in accordance with the use of the coating composition. The coating composition may further contain various additives appropriately selected according to the use.

Where a coating composition for the production of a metal gasket is to be prepared, any fluorine rubber can be used. In particular, fluorine rubbers having a Mooney viscosity $ML_{1+10}$ of not more than 30 at 121° C. are preferred. If necessary, the fluorine rubber may be used in combination with a vulcanizing agent, a vulcanization assistant and a vulcanization accelerator so as to be vulcanizable.

In order to provide a thick coat having a smooth surface, the fluorine rubber-containing coating composition for screen printing preferably contains not less than 15 parts by weight, still preferably 15 to 50 parts by weight, particularly preferably 20 to 40 parts by weight, of carbon powder.

From the viewpoint of surface roughness Ra of the coating layer formed, a preferred coating composition is such that provides a coating layer having an Ra of not more than 0.35 $\mu$m, still preferably not more than 0.3 $\mu$m. Such a surface roughness is comparable to that of a coating layer formed by roll coating which is deemed to involve no air bubble entrapment. The carbon powder to be used is not particularly limited. Carbon powder having an average particle size of not greater than 50 $\mu$m, preferably not greater than 30 $\mu$m, still preferably not greater than 10 $\mu$m, is suitable.

The fluorine rubber-containing coating composition of the present invention is useful for, for example, the production of a metal gasket. The coating composition for this particular use may contain various additives, such as fillers, curing accelerators, acid acceptors, processing aids (e.g., Viton LM produced by Showa Denko Dupont K.K.), antioxidants, pigments or coloring agents (e.g., titanium dioxide, carbon black and red iron oxide), coupling agents (e.g., γ-(2-aminoethyl)aminopropyl trimethoxysilane), scorch retarders, various rubbers other than the fluorine rubber, and water-absorbing or oil-absorbing resins.

In particular, it is recommended to add fillers, such as talc and clay, and acid acceptors, such as calcium hydroxide; for these additives are effective to reduce the viscosity of the coating composition.

Examples of additives which may be incorporated into a coating composition for the production of a metal gasket include fillers, such as carbon, talc, clay, barium sulfate, silica, mica, vermiculite, alumina, and calcium carbonate; curing accelerators or acid acceptors, such as magnesia and metal oxides, e.g., calcium hydroxide; antioxidants, pigments, coloring agents, coupling agents, and scorch retarders. These additives are generally used in amounts commonly employed in the art.

Rubbers other than fluorine rubbers which can be used as additives include (hydrogenated) acrylonitrile-butadiene rubber, an acrylic rubber, an epichlorohydrin rubber, natural rubber, a styrene-butadiene rubber, and a silicone rubber. These rubbers are used in an amount not exceeding the amount of the fluorine rubber.

Water-absorbing or oil-absorbing resins are capable of swelling on absorption of water or oil and are effective to improve sealing performance of a gasket against water or oil. They are used in an amount of 10 to 100 parts by weight per 100 parts by weight of the fluorine rubber.

The water-absorbing resins include natural or synthetic, hydrophilic, and water-insoluble high polymers containing an ionizing group, such as a carboxyl group, a sulfo group, a phospho group, a quaternary ammonium base, an amino group, an imino group or a pyridium base, or a salt thereof and/or a nonionic hydrophilic group, such as a hydroxyl group, an ether group, a chain-like or cyclic amido group or a nitrile group.

Specific examples of the above-mentioned high polymers include an acrylic acid (or a salt thereof)/divinylbenzene copolymer, an alkali hydrolysis product of an acrylonitrile/vinyl chloride/ethylenically unsaturated monomer copolymer, an alkali hydrolysis product of an acrylonitrile/vinylidene chloride/ethylenically unsaturated monomer copolymer, a formaldehyde-crosslinked acrylamide-based copolymer, a condensation product of polyacrylic acid and polyvinyl alcohol, epichlorohydrin-crosslinked polyvinyl alcohol, a formaldehyde-crosslinked alkali hydrolysis product of an acrylonitrile polymer, and a condensation product of polyvinyl alcohol and phosphoric acid. Also included are a 2-hydroxyethyl methacrylate/ethylene glycol dimethacrylate copolymer, a 2-methyl-5-vinylpyridine/N,N'-methylenebisacrylamide copolymer, an N,N'-dimethylaminoethyl methacrylate/N,N'-methylenebisacrylamide copolymer, an N-vinyl-2-pyrrolidone/ethylene glycol dimethacrylate copolymer, radiation-crosslinked polyoxyethylene, a condensation product of starch obtained by heating under an acidic condition, a saponification product of a starch/acrylonitrile graft copolymer, a saponification product (dried) of a copolymer of a vinyl ester and an ester type unsaturated carboxylic acid or a derivative thereof, and an isobutylene/maleic acid copolymer.

The oil-absorbing resins include polynorbornene rubber type oil-absorbing resins and self-swelling acrylic polymers. They are commercially available under trade names of OLEOSORB (produced by Nippon Shokubai Kagaku Kogyo Co., Ltd.). Inter alia, aqueous slurries of particles (OLEOSORB SL-200), especially those of emulsion type (OLEOSORB EM-631) are preferred.

The coating composition can be prepared by, for example, mixing up the above-described components either one by one or as a mixture of some of them using a solvent as a medium. The coating composition may have an arbitrary solids content. The coating composition for providing a thick coat as in the production of a metal gasket generally has a solids content of 15 to 70% by weight, preferably 20 to 60% by weight, still preferably 25 to 50% by weight.

A recommended method for preparing the coating composition comprises previously mixing a fluorine rubber, carbon powder and other necessary additives and dissolving the mixture in a solvent. This method tends to be effective to prepare a coating composition with a reduced viscosity.

A metal gasket can be produced by, for example, coating a part or the entire surface on one or both sides of a metallic substrate with the coating composition of the present invention by screen printing and drying or vulcanizing the coating layer under heat. The thickness of the coating layer is appropriately decided according to the use. Taking the demand for a gasket with a reduced thickness into consideration, the coating layer usually has a thickness of not more than 500 $\mu$m, preferably 5 to 200 $\mu$m, still preferably 10 to 100 $\mu$m.

The metallic substrate which can generally be used includes a 50 $\mu$m to 1 mm thick flat plate having a single layer structure or a laminate structure made of steel, iron, an iron-based metal (e.g., zinc-plated iron, tin-plated iron), copper, a copper-based metal (e.g., brass), aluminum, an aluminum alloy, or a high-strength metal, such as stainless steel, the edge of which may be turned or beaded. In order to improve adhesion between the metallic substrate to the rubber coat, the metallic substrate may previously be coated with an appropriate adhesive, such as an acrylonitrile rubber/ phenolic resin solution or a coupling agent (e.g., a silane coupling agent).

The present invention will now be illustrated in greater detail with reference to Examples, but it should be understood that the present invention is not deemed to be limited thereto. Unless otherwise indicated, all the parts and percents are by weight.

EXAMPLE 1

A hundred parts (on a solid basis, hereinafter the same) of a vulcanizable fluorine rubber having a Mooney viscosity ($ML_{1+10}$, 121° C.) of 30, 3 parts of magnesium oxide (vulcanization assistant), 6 parts of calcium hydroxide, 10 parts of MT carbon, and 20 parts of a water-absorbing resin (Aqualic CA ML-20, produced by Nippon Shokubai Kagaku Kogyo Co., Ltd.) were mixed with isoamyl acetate as a solvent to prepare a coating composition having a solids content of 25%.

The coating composition was applied to a 200 μm thick stainless steel plate by screen printing, dried, and vulcanized to obtain a metal gasket having a 20 μm thick coating layer on each side thereof.

EXAMPLE 2

A metal gasket was prepared in the same manner as in Example 1, except for replacing isoamyl acetate with isobornyl acetate.

COMPARATIVE EXAMPLE 1

A metal gasket was prepared in the same manner as in Example 1, except for replacing isoamyl acetate with methyl ethyl ketone.

COMPARATIVE EXAMPLE 2

A metal gasket was prepared in the same manner as in Example 1, except for replacing isoamyl acetate with a mixed solvent consisting of 50 parts of isoamyl acetate and 50 parts of methyl ethyl ketone.

COMPARATIVE EXAMPLE 3

A metal gasket was prepared in the same manner as in Example 1, except for replacing isoamyl acetate with methyl isobutyl ketone.

Evaluation

1) Continuous Coating Performance

Metal gaskets were continuously produced in the foregoing Examples and Comparative Examples. The time which elapsed before the screen was clogged due to drying of the coating composition to make screen printing difficult was measured.

2) Viscosity

The initial viscosity and the viscosity after the continuous coating operation of each of the coating compositions prepared was measured.

The results of the above evaluation are shown in Table 1 below.

TABLE 1

| | Continuous Coating Performance (min) | Initial Viscosity (cP) | Viscosity After Continuous Coating (cP) |
|---|---|---|---|
| Example 1 | more than 60 | 8,000 | 10,000 |
| Example 2 | more than 120 | 12,000 | 13,000 |
| Comparative Example 1 | 5 | 3,000 | unmeasurable (more than 100,000) |
| Comparative Example 2 | 10 | 5,000 | unmeasurable (more than 100,000) |
| Comparative Example 3 | 5 | 4,000 | unmeasurable (more than 100,000) |

As is clear from the above results, although the gasket compositions of the present invention have higher initial viscosity than those of Comparative Examples due to the use of the solvents having higher boiling points, the change in viscosity during coating is less and as a result, continuous coating is possible.

EXAMPLE 3

A hundred parts of a vulcanizable fluorine rubber having a Mooney viscosity ($ML_{1+10}$, 121° C.) of 30 and 15 parts of MT carbon were previously mixed, and the resulting mixture was dissolved in isoamyl acetate to prepare a coating composition having a solids content of 25%.

The coating composition was applied to a 200 μm thick stainless steel plate by screen printing, dried, and vulcanized to obtain a metal gasket having a 20 μm thick coating layer on each side thereof.

EXAMPLE 4

A metal gasket was prepared in the same manner as in Example 3, except for increasing the amount of MT carbon to 20 parts.

EXAMPLE 5

A metal gasket was prepared in the same manner as in Example 3, except for increasing the amount of MT carbon to 27.5 parts.

EXAMPLE 6

A metal gasket was prepared in the same manner as in Example 3, except for increasing the amount of MT carbon to 35 parts.

REFERENCE EXAMPLE

A metal gasket was prepared in the same manner as in Example 3, except for decreasing the amount of MT carbon to 10 parts.

Evaluation

1. Viscosity

The initial viscosity of each of the coating compositions prepared was measured.

2. Surface Roughness

The surface roughness of the coating layer of the metal gaskets prepared in Examples 3 to 6 and Reference Example was measured.

The results obtained are shown in Table 2 below.

TABLE 2

|  | Initial Viscosity | Surface Roughness Ra (μm) | Continuous Coating Performance (min) |
| --- | --- | --- | --- |
| Example 3 | 8200 | 0.32 | more than 60 |
| Example 4 | 6500 | 0.30 | " |
| Example 5 | 5700 | 0.25 | " |
| Example 6 | 4600 | 0.25 | " |
| Reference Example | 8800 | 0.42 | " |

As is clear from the above results, the compositions of the present invention provide excellent continuous coating performance. Further, as the amount of carbon powder to be contained in the composition is increased, the surface roughness is reduced, and in view of the smoothness of the composition, it is preferred that the carbon powder content is at least 15 parts by weight per 100 parts by weight of the fluorine rubber.

While the invention has been described in detail and with reference to specific examples thereof, it will be apparent to one skilled in the art that various changes and modifications can be made therein without departing from the spirit and scope thereof.

What is claimed is:

1. A fluorine rubber containing coating composition for screen printing comprising:

a fluorine rubber dissolved in a solvent, said fluorine rubber having a Mooney viscosity ($ML_{1+10}$) of not more than 30 at 121° C., and 15 to 50 parts by weight of carbon powder having an average particle size of not greater than 50 μm per 100 parts by weight of the fluorine rubber containing coating composition, wherein the solvent which dissolves the fluorine rubber comprises 60 to 100% by weight, based on the total solvent, of at least one ester which has a boiling point of from 142.5° C. to 215° C. and is selected from the group consisting of isoamyl acetate, n-amyl acetate, cyclohexyl acetate, isoamyl propionate, isoamyl butyrate, butyl butyrate, and isobornyl acetate, and wherein said fluorine rubber containing coating composition has the following physical properties:
   (a) coats to a thickness of 5 μm to 500 μm and to a surface roughness Ra of 0.35 μm or less in a single printing on a metal substrate by screen printing and,
   (b) substantially does not clog a screen when used in a screen printing process.

2. A fluorine-rubber containing coating composition for screen printing according to claim 1, wherein said composition further comprises talc, clay and/or an acid acceptor.

3. A fluorine-rubber containing coating composition for screen printing according to claim 2, wherein said composition is a composition prepared by previously mixing at least the fluorine rubber and carbon powder and dissolving the mixture in the solvent.

4. A fluorine-rubber containing coating composition for screen printing according to claim 1, wherein said composition is a composition prepared by previously mixing at least the fluorine rubber and carbon powder and dissolving the mixture in the solvent.

5. A fluorine-rubber containing coating composition for screen printing according to claim 1, wherein said composition screen prints to a thickness of 7 μm or more in a single printing on a metal substrate.

6. A fluorine-rubber containing coating composition for screen printing according to claim 1, wherein said composition contains 20 to 40 parts by weight of carbon powder per 100 parts by weight of the fluorine.

7. A fluorine-rubber containing coating composition for screen printing according to claim 1, wherein said carbon powder has an average particle size of not greater than 30 μm.

8. A fluorine rubber containing coating composition for screen printing comprising:

a fluorine rubber dissolved in a solvent, and 15 to 50 parts by weight of carbon powder having an average particle size of not greater than 50 μm per 100 parts by weight of the fluorine rubber, wherein the solvent which dissolves the fluorine rubber comprises 60 to 100% by weight, based on the total solvent, of an ester which has a boiling point of from 142.5° C. to 215° C. and is selected from the group consisting of isoamyl acetate, n-amyl acetate, cyclohexyl acetate, isoamyl propionate, isoamyl butyrate, butyl butyrate, and isobornyl acetate, and wherein said coating composition has the following characteristics:
   (a) forms a coat of 7 μm or more on a metal substrate in a single printing by screen printing; and
   (b) substantially does not clog a screen during continuous screen printing.

* * * * *